(12) United States Patent
Tang

(10) Patent No.: US 7,075,577 B2
(45) Date of Patent: Jul. 11, 2006

(54) AUTO-EXPOSURE POWER-SAVING DEVICE

(75) Inventor: Hsueh-Yung Tang, Hsinchu (TW)

(73) Assignee: Altek Corporation, Hsinchu (TW)

(*) Notice: Subject to any disclaimer, the term of this patent is extended or adjusted under 35 U.S.C. 154(b) by 644 days.

(21) Appl. No.: 10/191,524

(22) Filed: Jul. 10, 2002

(65) Prior Publication Data

US 2004/0008272 A1    Jan. 15, 2004

(51) Int. Cl.
*H04N 5/335* (2006.01)
*H04N 5/225* (2006.01)

(52) U.S. Cl. ..................... 348/362; 348/372
(58) Field of Classification Search ........ 348/362–364, 348/296–298, 370; 396/213, 221
See application file for complete search history.

(56) References Cited

U.S. PATENT DOCUMENTS

| | | | | |
|---|---|---|---|---|
| 5,734,426 A | * | 3/1998 | Dong | 348/297 |
| 5,793,422 A | * | 8/1998 | Mochizuki et al. | 348/296 |
| 5,825,417 A | * | 10/1998 | Yoshida | 348/364 |
| 6,630,960 B1 | * | 10/2003 | Takahashi et al. | 348/364 |
| 2002/0067413 A1 | * | 6/2002 | McNamara | 348/216 |

* cited by examiner

*Primary Examiner*—Tuan Ho
*Assistant Examiner*—Timothy J. Henn
(74) *Attorney, Agent, or Firm*—Rosenberg, Klein & Lee

(57) ABSTRACT

The present invention provides an auto-exposure power-saving device, which comprises an image brightness calculation unit for calculating the brightness value of an image. A maximal tolerable brightness value and a minimal tolerable brightness value both set by a CPU of a digital still camera (DSC) are inputted to a first comparator and a second comparator. The first comparator is used to compare the image brightness value with the maximal tolerable brightness value and then output a first comparison signal. The second comparator is used to compare the image brightness value with the minimal tolerable brightness value and then output a second comparison signal. The CPU is then activated or not according to the first or second comparison signals. The present invention has the power-saving advantage and a longer lifetime of use.

2 Claims, 2 Drawing Sheets

AUTO-EXPOSURE POWER-SAVING DEVICE

FIELD OF THE INVENTION

The present invention relates to a power-saving device and; more particularly, to an auto-exposure power-saving device of a digital still camera.

BACKGROUND OF THE INVENTION

Along with progress of digital technology and enhancement of life quality, digital electronic products have gone deeply into every aspect of life. Because digital still cameras (DSCs) have the advantages of small volume, convenient use, powerful function, real-time preview, and unneeded development of negatives as compared with conventional cameras, they have been widely used by people, and have become indispensable digital electronic products in life and travel.

Generally speaking, a DSC will provide a preview mode and an auto-exposure mode. In the auto-exposure mode, the DSC will automatically adjust exposure parameters like exposure time and gain value according to the environmental brightness so that a user can easily take high-quality digital pictures. In the preview mode, a user can preview the photographed pictures in real time. When a conventional DSC operates in the auto-exposure mode, a central processing unit (CPU) thereof needs to calculate exact exposure time and gain value momentarily according to the environmental brightness, hence consuming more power and shortening the usable time of battery of the DSC. It is thus necessary for the user to bring more spare batteries or charge the battery of the DSC momentarily, resulting in much trouble and inconvenience in use.

Accordingly, the present invention aims to propose an auto-exposure power-saving device of a DSC to resolve the above problem.

SUMMARY AND OBJECTS OF THE PRESENT INVENTION

The primary object of the present invention is to propose an auto-exposure power saving device, which lets a CPU of a DSC be in a power-saving sleep mode within a tolerable range of environmental brightness, or activates the CPU to calculate the optimal exposure parameters according to the present environmental brightness when the environmental brightness is too high or too low so the exposure parameters need to be calculated again. After the calculation is finished, the CPU enters into the power-saving sleep mode again. The present invention thus has the advantage of power saving to increase the usable time of battery.

Another object of the present invention is to propose an auto-exposure power-saving device, which lets a DSC be not in the operational status momentarily so as to have a longer lifetime of use.

To achieve the above objects, the present invention proposes an auto-exposure power-saving device, which comprises an image brightness calculation unit for calculating the brightness value of an image taken by a CCD of a DSC and then inputting the image brightness value to a first comparator and a second comparator. The first comparator is used to compare the image brightness value with a maximal tolerable brightness value set in the DSC. The second comparator is used to compare the image brightness value with a minimal tolerable brightness value set in the DSC. The first and second comparators output a first comparison signal and a second comparison signal, respectively. The CPU is then activated or not according to the first and second comparison signals.

The various objects and advantages of the present invention will be more readily understood from the following detailed description when read in conjunction with the appended drawings, in which:

DETAILED DESCRIPTION OF PREFERRED EMBODIMENT

Figure 1:
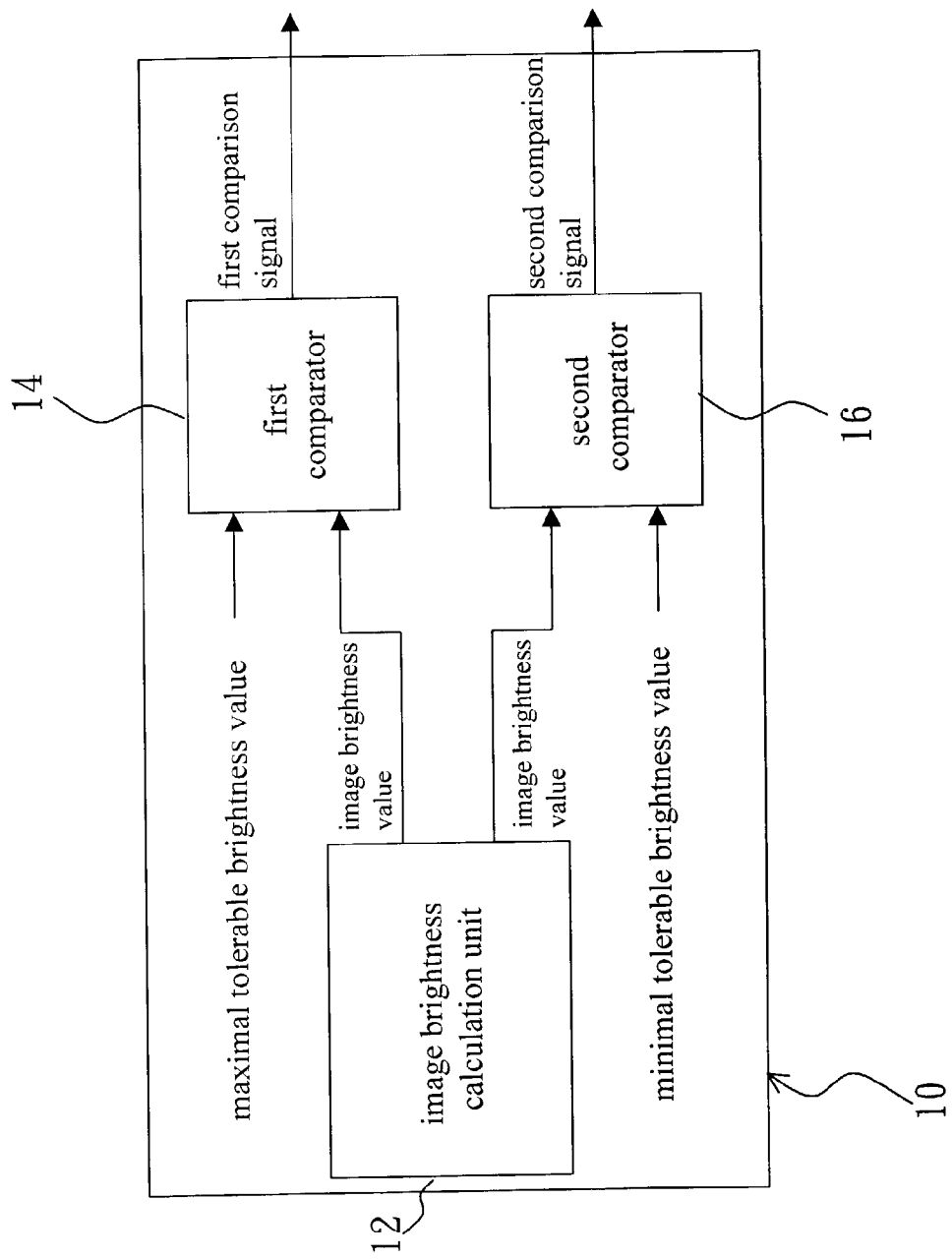
FIG. 1 is a structural block diagram of the present invention.
Figure 2:
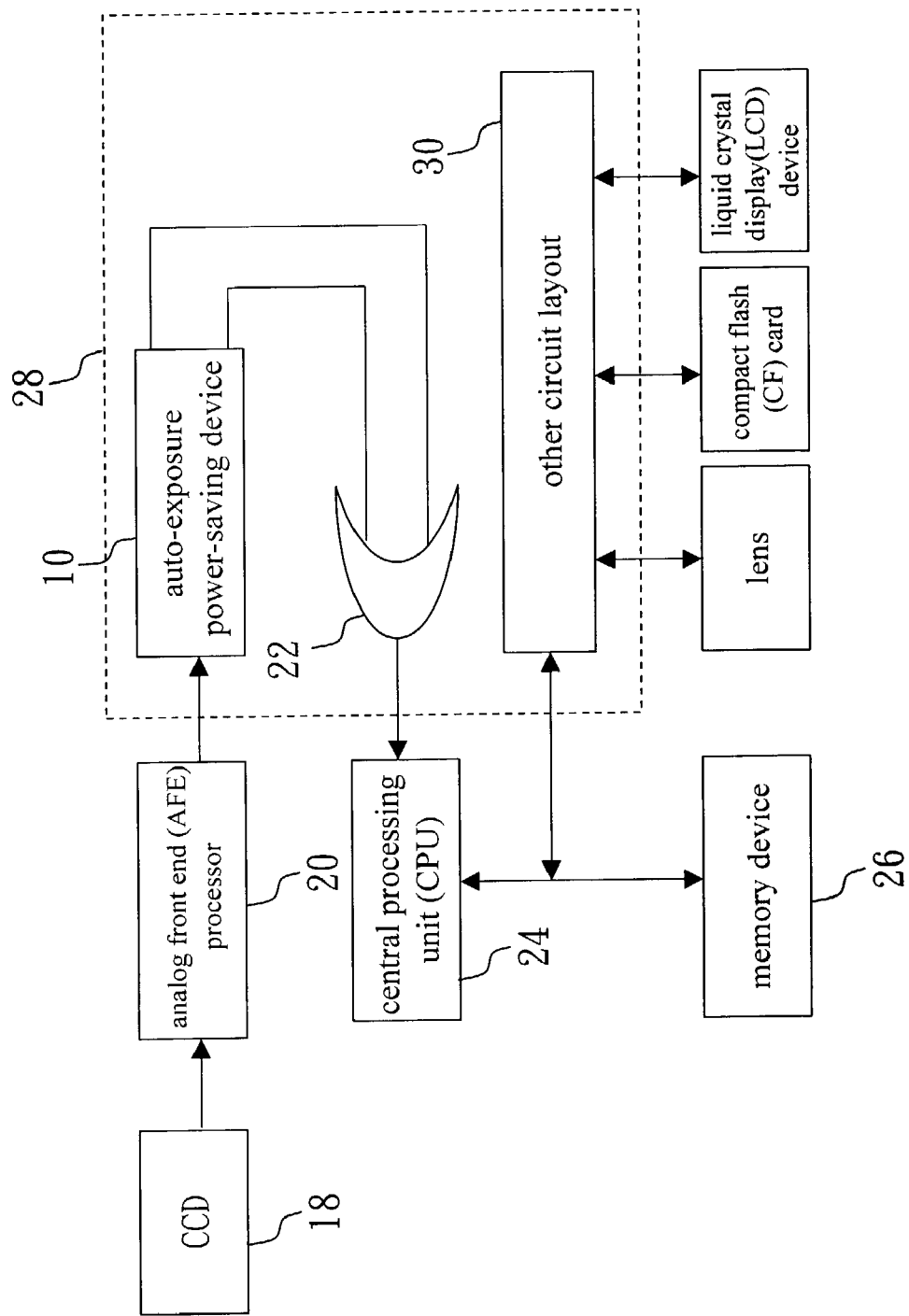
FIG. 2 is a diagram of an embodiment of the present invention.

The present invention is characterized in that an auto-exposure power-saving device is disposed inside a DSC to control the operational statuses of a CPU and a memory device of the DSC. As shown in FIGS. 1 and 2, the auto-exposure power-saving device 10 comprises an image brightness calculation unit 12, which is connected to a CCD 18 of the DSC and is used to calculate the brightness value of an image taken by the CCD 18. The image brightness calculation unit 12 is also connected to a first comparator 14 and a second comparator 16. The image brightness value is inputted to the first and second comparators 14 and 16. A maximal tolerable brightness value and a minimal tolerable brightness value both set by a CPU 24 are inputted to the first and second comparators 14 and 16, respectively. The first comparator is used to compare the image brightness value with the maximal tolerable brightness value and then output a first comparison signal indicating whether the image brightness value is larger than maximal tolerable brightness value or not. The second comparator is used to compare the image brightness value with the minimal tolerable brightness value and then output a second comparison signal indicating whether the image brightness value is smaller than minimal tolerable brightness value or not. The CPU 24 is then activated to automatically adjust the required exposure time and gain value or not according to the first and second comparison signals.

An analog front end (AFE) processor 20 is disposed between the auto-exposure power-saving device 10 and the CCD 18 to let the image taken by the CCD 18 be first processed by the AFE processor 20 and then transferred to the image brightness calculation unit 12 of the auto-exposure power-saving device 10 for calculation of image brightness. The first and second comparators 14 and 16 are connected to an OR gate 22, which outputs an electric signal according to the first and second comparison signals for discriminating whether the image brightness value is within the tolerable range of brightness, exceeds the maximal tolerable brightness value (i.e., too bright), or is lower than the minimal tolerable brightness value (i.e., too dark). The output end of the OR gate 22 is connected to the CPU 24. The CPU is also connected to a memory device 26, usually being an SDRAM.

When the above DSC enters into an auto-exposure mode, the CPU 24 is first used to re-calculate a maximal tolerable brightness value and a minimal tolerable brightness value according to the present environmental state. The DSC then enters into a power-saving sleep mode to save the power consumption of the CPU 24 and the memory device 26. When the DSC operates in the preview mode, the image taken by the CCD 18 is first judged by the auto-exposure power-saving device 10. When the image brightness is within the tolerable range of brightness, i.e., between the maximal tolerable brightness value and the minimal tolerable brightness value, the CPU 24 will not be activated. When the image brightness is too large or too small, the auto-exposure power-saving device will activate the CPU 24 to re-calculate the exposure time and gain value of the DSC again according to the too large or too low image brightness value. Simultaneously, a new maximal tolerable brightness value and a new minimal tolerable brightness value are set again according to the new exposure time and gain value. After the CPU 24 finishes the setting, it enters into the power-saving sleep mode again.

In order to let the present invention have a convenient use, the auto-exposure power-saving device 10 or the logic gate 22 is integrated onto a control chip 28. Control functions of lens, compact flash card, and preview of liquid crystal display panel are also integrated into other circuit layouts 30 of the control chip 28.

In the present invention, the auto-exposure power-saving device 10 is used to let the CPU 24 and the memory device 26 be in the power-saving sleep mode within a tolerable range of environmental brightness. When the environmental brightness is too large or to low, the CPU 24 is activated to calculate the optimal exposure parameters again according to the present environmental brightness. Therefore, the CPU 24 and the memory device 26 will have the advantage of power saving to increase the usable time of battery. Moreover, because the CPU 24 is not in the operational status for a long time, it will have a longer lifetime of use.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An auto-exposure power-saving device for controlling the operational status of a central processing unit of a digital still camera when said digital still camera operates in an auto-exposure mode, said auto-exposure power-saving device comprising:

said central processing unit setting an upper brightness limit value and a lower brightness limit value for said auto-exposure mode responsive to said digital still camera entering said auto-exposure mode, said central processing unit entering a power-saving sleep mode subsequent to said calculations being completed;

an image brightness calculation unit for calculating a brightness value of an image taken by a CCD of said digital still camera;

a first comparator and a second comparator each having a first input connected to said image brightness calculation unit for input of said brightness value thereto, said first comparator having a second input for receiving said upper brightness limit value and comparison thereof with said image brightness value for generating a first limit signal at an output thereof if said image brightness value is greater than said upper brightness limit value, said second comparator having a second input for receiving said lower brightness limit value and comparison thereof with said image brightness value for generating a second limit signal at an output thereof if said image brightness value is less than said lower brightness limit value;

an OR gate having a first input coupled to said output of said first comparator, a second input coupled to said output of said second comparator, and an output coupled to said central processing unit, said OR gate generating a wakeup signal at said output thereof responsive to input of one of said first limit signal or said second limit signal, said central processing unit exiting said power-saving sleep mode to enter an active mode and calculating new upper and lower limit values responsive to input of said wakeup signal.

2. The auto-exposure power-saving device as claimed in claim 1, wherein said central processing unit calculates an exposure time and a gain value of said digital still camera according to said image brightness value and sets said upper brightness value and said lower brightness value according to said exposure time and said gain value before returning to said power-saving sleep mode.

* * * * *